(12) United States Patent
Demmeler

(10) Patent No.: US 9,476,540 B2
(45) Date of Patent: Oct. 25, 2016

(54) DISPLACEMENT SYSTEM FOR AN ASSEMBLY BENCH OR A WELDING BENCH

(71) Applicant: Demmeler Automatisierung Und Roboter GmbH, Heimertingen (DE)

(72) Inventor: Johannes Demmeler, Amendingen (DE)

(73) Assignee: DEMMELER AUTOMATISIERUNG UND ROBOTER GMBH, Heimertingen (DE)

( * ) Notice: Subject to any disclaimer, the term of this patent is extended or adjusted under 35 U.S.C. 154(b) by 50 days.

(21) Appl. No.: 14/427,261

(22) PCT Filed: Sep. 9, 2013

(86) PCT No.: PCT/EP2013/068641
§ 371 (c)(1),
(2) Date: Mar. 10, 2015

(87) PCT Pub. No.: WO2014/037568
PCT Pub. Date: Mar. 13, 2014

(65) Prior Publication Data
US 2015/0219273 A1   Aug. 6, 2015

(30) Foreign Application Priority Data
Sep. 10, 2012 (DE) .................. 10 2012 216 020

(51) Int. Cl.
*F16M 11/20* (2006.01)
*F16M 11/42* (2006.01)
(Continued)

(52) U.S. Cl.
CPC .............. *F16M 11/425* (2013.01); *B25H 1/02* (2013.01); *B25H 1/04* (2013.01)

(58) Field of Classification Search
USPC ...................................... 248/188.1
See application file for complete search history.

(56) References Cited

U.S. PATENT DOCUMENTS 5,318,284 A * 6/1994 Demmeler ......... B23K 37/0461
269/203
5,681,255 A * 10/1997 Simmons ................. B25H 1/02
493/346

(Continued)

FOREIGN PATENT DOCUMENTS

DE    38 04 156 A1    8/1989
DE    202 06 949 U1   8/2002

(Continued)

OTHER PUBLICATIONS

Sep. 25, 2013 International Search Report Issued International Application No. PCT/EP2013/068461 (with English Translation).

*Primary Examiner* — Monica Millner
(74) *Attorney, Agent, or Firm* — Sutherland Asbill & Brennan LLP

(57) ABSTRACT

The invention relates to a moving system for an assembly table or welding bench to be able to rapidly and safely adapt the size of the work area by moving the assembly table or welding bench or further support elements to the workpiece to be machined. The moving system comprises a guide rail (10) with grid holes (11); a foot element (20) for an assembly table or welding bench (40) which can be contacted with the guide rail (10) at a first end region, wherein a contact area and a rolling means are arranged at the first end region. The moving system also comprises an adjustment means which is coupled to the rolling means, wherein the rolling means can be moved from a first position relative to the contact area (22) to a second position relative to the contact area using the adjustment means, wherein in the first position the contact area (22) contacts the guide rail (10) in a planar fashion and wherein in the second position the foot element (20) on the guide rail (10) is supported on the rolling means and can be moved linearly along the guide rail (10) using the rolling means.

20 Claims, 13 Drawing Sheets

(51) Int. Cl.
  *B25H 1/02* (2006.01)
  *B25H 1/04* (2006.01)

(56) References Cited

U.S. PATENT DOCUMENTS

| | | | | | |
|---|---|---|---|---|---|
| 5,711,227 | A | * | 1/1998 | Johnson | E01B 23/00 104/106 |
| 5,829,501 | A | * | 11/1998 | DeVito | B25H 1/02 108/162 |
| 5,839,721 | A | * | 11/1998 | Kobayashi | B23Q 1/40 271/195 |
| 6,019,359 | A | * | 2/2000 | Fly | B23K 37/0461 269/289 R |
| 6,079,703 | A | * | 6/2000 | Chavez, Jr. | B25B 5/068 269/147 |
| 6,375,177 | B1 | * | 4/2002 | Witte | B23Q 3/103 269/289 R |
| 6,412,764 | B1 | * | 7/2002 | Hebert | B25B 5/006 269/246 |
| 6,672,577 | B2 | * | 1/2004 | Murvine | B25B 5/006 269/45 |
| 2007/0251408 | A1 | * | 11/2007 | Fletcher | B61B 13/02 104/247 |
| 2010/0301538 | A1 | * | 12/2010 | Turner | B25H 1/0007 269/56 |

FOREIGN PATENT DOCUMENTS

| | | |
|---|---|---|
| DE | 20 2007 000757 U1 | 3/2007 |
| DE | 10 2010 017424 A1 | 12/2011 |
| EP | 0541904 A1 | 5/1993 |
| FR | 2 414 100 A1 | 8/1979 |

* cited by examiner

DISPLACEMENT SYSTEM FOR AN ASSEMBLY BENCH OR A WELDING BENCH

CROSS REFERENCE TO RELATED APPLICATIONS

This application is a national stage of International Patent Application No. PCT/EP2013/068641 filed on Sep. 9, 2013, which claims benefit of German Patent Application No. DE 10 2012 216 020.5 filed on Sep. 10, 2012. The original disclosures of the prior applications are incorporated by reference herein in their entirety.

FIELD OF INVENTION

The invention relates to a moving system for an assembly table or welding bench to be able to quickly adapt the size of a work area by moving the assembly table or welding bench or further support elements to the workpiece to be machined.

BACKGROUND

The prior art discloses so-called clamping systems or 3D clamping systems for the construction of fixtures. Such clamping systems are based on an assembly table or welding bench, which are also referred to as a dressing table or 3D work table, which has cylindrical through holes that are arranged in the table top and along the edges of the table, serve directly for receiving clamping elements and are uniformly distributed over the surface at predetermined distances. Such a table is known from EP-A 05 41 904 B1, for example. One or more assembly tables having such a hole grid system or grid holes form in conjunction with the most different stop, clamping and positioning elements a 3D clamping system by means of which very complex and modular devices can be arranged on the table in a minimum of time. 3D clamping systems are used e.g. in steel construction, the shaping of sheet, the robotic technology and also in laser welding, laser cutting and the prototype or car body manufacture.

The arrangement or machining of a device often requires the adaptation of the available work area. For example, it may be necessary to further machine the device fixed on the assembly table at another work place, as a result of which the device plus the assembly table have to be moved. In other cases, the assembly table per se must be moved relative to the workpiece to support or fix another location, or the available support or assembly area shall be increased or reduced in the course of the machining steps.

The prior art discloses to provide for this purpose the bottom area with attachment rails where the assembly table can be attached to various, predetermined locations, e.g. characterized by grid holes, which make an accurate re-measurement or readjustment of the new table position superfluous.

However, in order to be able to attach the assembly tables to a new location of the attachment rail, the heavy assembly tables were formerly lifted by a crane or lifting carriage and relocated to the new location.

However, these approaches known from the prior art require heavy equipment (crane or lifting carriage) and an accurate positioning when the assembly table is lowered onto the assembly rail. A further drawback is that the use of such movement systems is time-consuming and cannot always be carried out for reasons of space.

SUMMARY OF INVENTION

It is therefore an object of the present invention to provide a moving system for an assembly table or welding bench, which enables rapid, easy and safe moving of the assembly table.

This object is achieved by a moving system for an assembly table or welding bench according to the features of claim 1. The dependent claims relate to advantageous embodiments of the invention.

An assembly table can be moved linearly along a rail system by means of the moving system according to the invention. A welding table, dressing table or 3D work table of a clamping system is also understood to mean an assembly table according to this invention. The moving system according to the invention comprises a guide rail with grid holes. The moving system can also comprise 2, 3 or more guide rails which can preferably be arranged parallel and at any distance from one another.

The moving system also comprises at least one foot element for an assembly table or welding bench, which can be contacted at a first end region by means of the guide rail, wherein a contact area and a rolling means are arranged at the first end region. The contact area can be brought into area contact with a corresponding area of support of the guide rail to enable a safe standing position of the foot element.

The moving system also comprises an adjustment means which is coupled to the rolling means, wherein by means of the adjustment means the rolling means can be changed from a first position relative to the contact area into a second position relative to the contact area, wherein in the first position the contact area contacts the guide rail in a planar fashion and wherein in the second position the foot element is supported on the guide rail using the rolling means and can be moved linearly along the guide rail using the rolling means.

The adjustment means makes it thus possible to switch between a support position and a moving position of the foot element. In the support position, i.e. the first position of the rolling means, the foot element is stably supported via the contact area on a corresponding area of support of the traversing rail. However, in the traveling position, i.e. the second position of the rolling means, the contact area of the foot relative to the rolling means is slightly lifted and no longer contacts the corresponding area of support of the traversing rail, and therefore the foot can be linearly guided on the rolling means along the rails. The foot elements according to the invention thus comply with a dual function: they serve as both support elements for the assembly table and a moving device to move the table.

In order to fix the foot element in the first position, at least one bore or elongated hole can be provided at the first end region of the foot element, which can be superimposed with one of the grid holes of the guide rail. The bore can also be made as an elongated hole. The advantage of an elongated hole is that it is thus possible to finely position the foot element relative to the rail by displacement within the elongated hole. Using a suitable attachment means, such as a clamping bolt, a screw, etc., which engages the superimposed holes, the foot element can be secured on the rail against displacement or shifting. For this purpose, the attachment means connects the contact area of the foot element to the corresponding area of support of the guide rail in frictional and/or positive engagement. The fixing by means of grid holes has the advantage that the foot element can be quickly attached to various, predetermined locations, and therefore an accurate re-measurement or readjustment of the new foot or table position is superfluous.

The adjustment means can be made as a spring which is arranged in such a way that it exerts a force depending on the tensioning state of the spring on a bearing axis of the rollers. It is also preferred for the spring to be a disk spring, which enables a compact overall height for the adjustment mechanism.

The spring can be tensioned additionally or further by tightening the attachment means, e.g. a clamping bolt, so as to move the rolling means from the second position to the first position. If the fixation between the foot element and the guide rail is released by detaching the attachment means, the spring changes into the biased state, and therefore the spring force slightly lifts the lower area of support of the foot element off the guide rail and the rolling means moves from the first position to the second position. The advantage is that clamping or fixing or detaching the attachment means simultaneously moves the rolling means from the second position to the first position or from the first position to the second position.

In a further advantageous embodiment, the adjustment means comprises an extender which is coupled to the rolling means in such a way that a movement of the extender effects the swiveling-out of the rolling means from the first position to the second position or from the second position to the first position. Furthermore, the extender is preferably coupled to the suspension or support of the rolling means in such a way that a rotation of the extender effects a lifting movement of the axis relative to the lower contact area of the foot element.

The rolling means preferably comprises rollers, i.e. disks rotatable about an axis, each disk forming a line contact with the guide rail in the second position. In order to move the foot element safely along the guide rail, the rollers can be made as flange rollers so as to guide the rollers linearly along the guide rail by means of a flange.

According to a further embodiment, the rolling means can comprise at least two ball rollers. Ball rollers comprise a housing having a hardened ball socket where many small support balls roll which, in turn, support a large running ball. Other than the rollers or rotary disks, the ball rollers are in point contact with the guide rail when in the second position. It is also preferred for the ball rollers to be spring-loaded, e.g. by means of disk springs. In order to safely move the foot element supported on ball rollers along the guide rail, a guide means is advantageously arranged on the guide rail in such a way that it guarantees a linear movement of the ball rollers on the guide rail, in spite of the point contact. The guide means can be realized by two lateral guide plates which are arranged on both sides of the guide rail, and therefore the guide plates prevent a movement counter to the longitudinal direction of the guide rail.

The rolling means can comprise spherical liners and rolling bearings.

The foot element advantageously has a planar connecting area with grid holes at a second end region opposite to the first end region in order that the foot element can be attached in a rapid and flexible way to an assembly table or assembly element with grid holes.

The foot element preferably comprises a U-shaped support body which connects the two end regions of the foot element and has a hole structure. This enables a high load-bearing capacity of the foot element while the weight is reduced.

A moving system can comprise at least two foot elements arranged one behind the other on the guide rail. The number of foot elements depends on the number or width of the table tops to be supported or support elements. In order to secure the foot elements against tilting or falling over, a support element can be arranged laterally with respect to the contact area on each foot element. Such a support element is preferably arranged in such a way that a lower area of support of the support element is spaced apart from a bottom area in such a way that slight tilting of the foot element results in contacting the support element with the bottom surface.

It is particularly advantageous for the support elements of two foot elements arranged on behind the other on the guide rail to be arranged on opposite sides of the guide rail since the foot elements can then be telescoped in compact fashion in spite of the support elements.

In summary, the present invention provides a moving system for an assembly table or welding bench, by means of which heavy assembly tables can be moved rapidly and easily without additional cranes or lifting carriages. Rollers or ball rollers as rolling means and the adjustment means according to the invention can be accommodated inside the foot element in a place-saving way. The roller mechanism according to the invention permits moving of the table by hand and a rapid exchange between a roller bearing of the foot elements on the guide rail and a secure planar bearing where the foot elements can safely be fixed on the guide rails by means of the contact areas, even when the load-bearing capacity is high. The moving system according to the invention thus enables a rapid adaptation of the work area by a few hand movements.

BRIEF DESCRIPTION OF DRAWINGS

Preferred embodiments of the present invention are described in more detail below by way of example and in exemplary fashion with reference to the enclosed drawings.

DETAILED DESCRIPTION

Figure 1A:
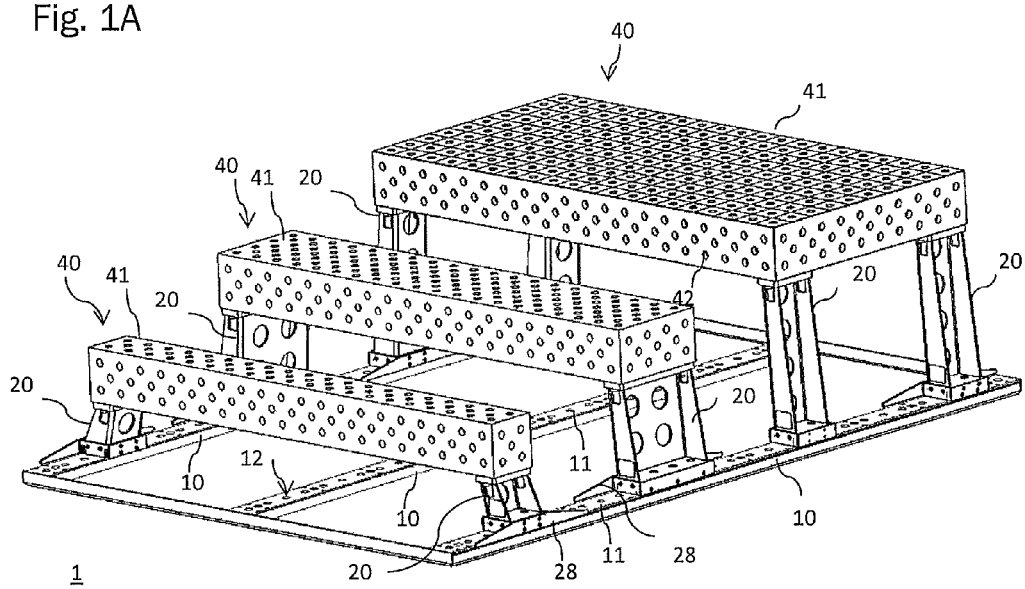
FIG. 1A and FIG. 1B show a perspective view and a side view of an embodiment of the moving system according to the invention.
Figure 1B:
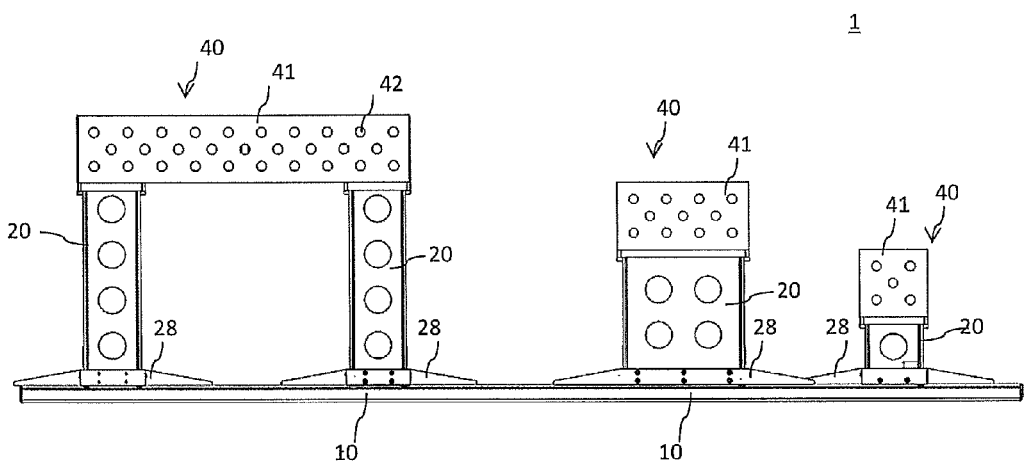

FIGS. 1A and 1B show by way of example an arrangement of assembly tables (40) which have table tops (41) of different width and are mounted on a moving system according to an exemplary embodiment. Three parallel guide rails (10) are mounted on a bottom surface. The assembly tables (40) which have grid holes (42) along their table tops (41) and along the side edges are attached to the guide rails (10) via foot elements (20).

The guide rails (10) have a planar, upper area of support (12) where a plurality of grid holes (11) is arranged.

Different table heights can be realized by foot elements (20) having different height. FIGS. 1A and 1B show e.g. foot elements having lengths of 200, 400 and 600 mm Depending on the intended use, a different number of guide rails can be used. The number of assembly tables and the number of foot elements can likewise be chosen as desired.

Figure 2A:
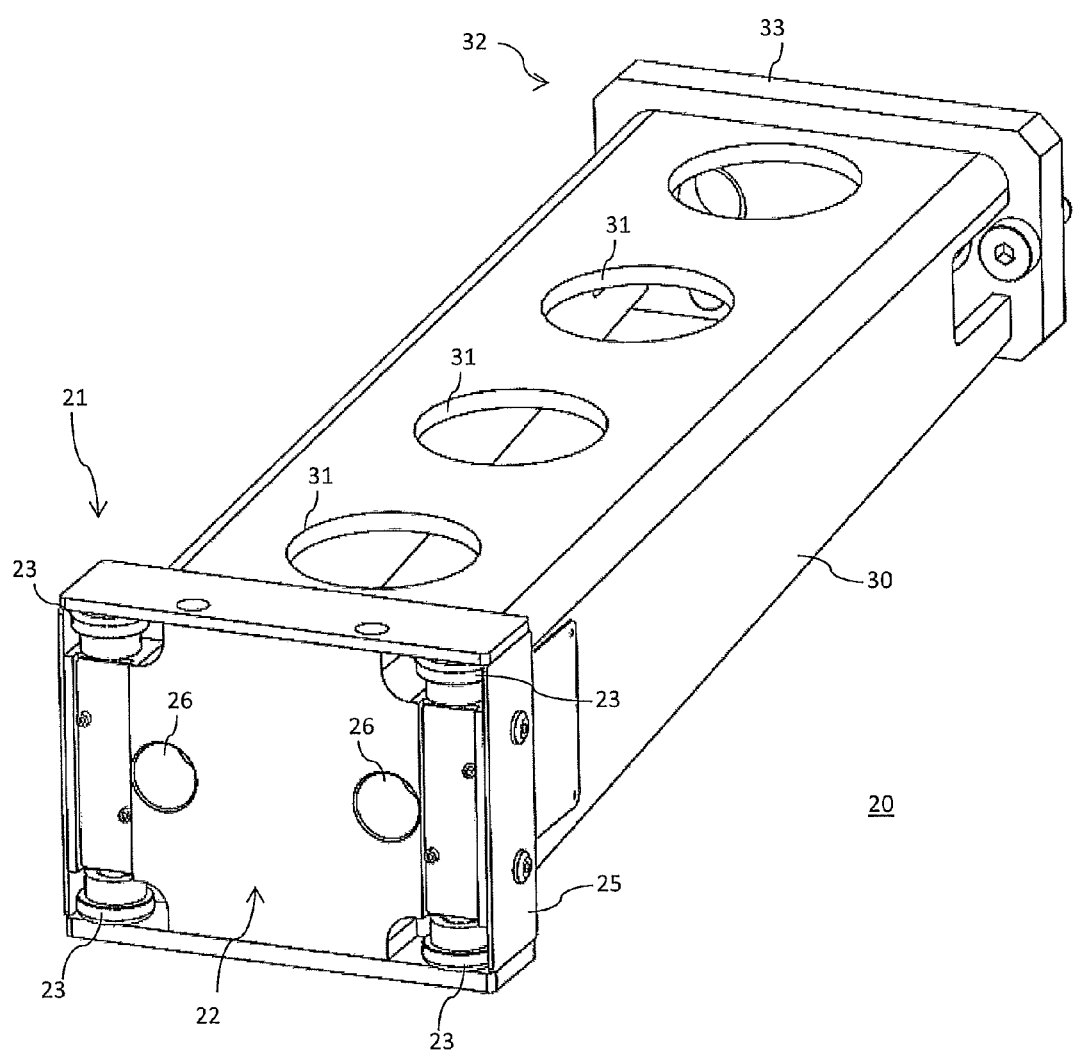
FIG. 2A and FIG. 2B show perspective bottom views of two exemplary embodiments of a foot element.
Figure 2B:
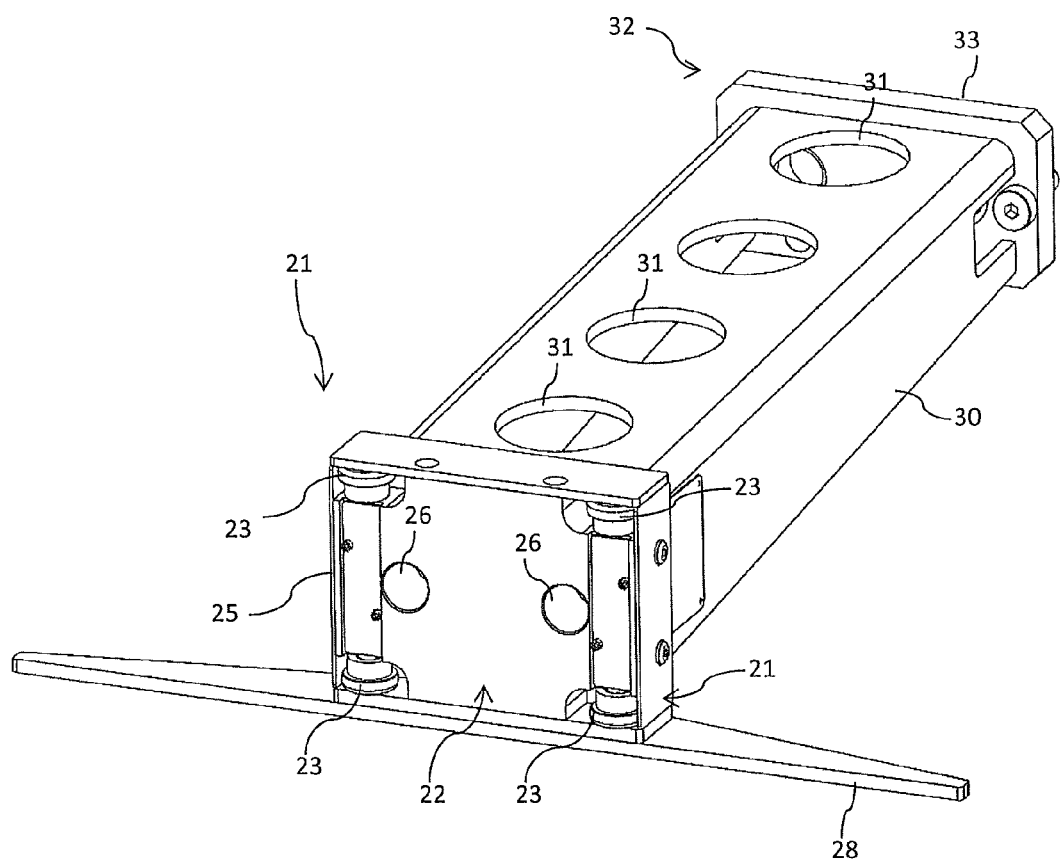

As shown in FIGS. 2A and 2B, the foot elements have a contact area (22) on their bottom side. In a fixed state (which is described below by means of FIGS. 5, 6A and 6B), the foot elements (20) rest in a planar fashion on the area of support (12) of the guide rails (10) via the lower contact area (22).

In addition, the contact area (22) is provided with bores (26) which can be superimposed with the grid holes (11) of the guide rails (10). The foot elements (20) can be clamped and fixedly secured at the guide rails (10) by means of a clamping bolt (50) which is inserted in the superimposed bores.

As is also shown in FIGS. 2A and 2B, the bottom side of the foot elements (20) is provided with rollers (23) to be able to linearly move the foot elements (20) in the non-fixed state in the longitudinal direction of the guide rails.

The four rollers (23), the two axles thereof and the contact plate (22) are accommodated in a slide (25) which is laterally confined by four rectangular plates. The slide plates simultaneously protect the rollers (23) against soiling and damage.

A connecting plate (33) is attached to the upper end (23) of the foot element (20). The connecting plate (33) has grid holes (34) by means of which the foot element can be mounted on a plate top or support element (41) of an assembly table, e.g. by means of a clamping bolt.

The body of the foot element (20), which connects the upper and lower end regions, consists of a plate-like U-type piece (30), which has a hole structure (31). The described design of the foot elements (20) enables a light-weight design and simultaneously a high load-bearing capacity.

Figure 3:
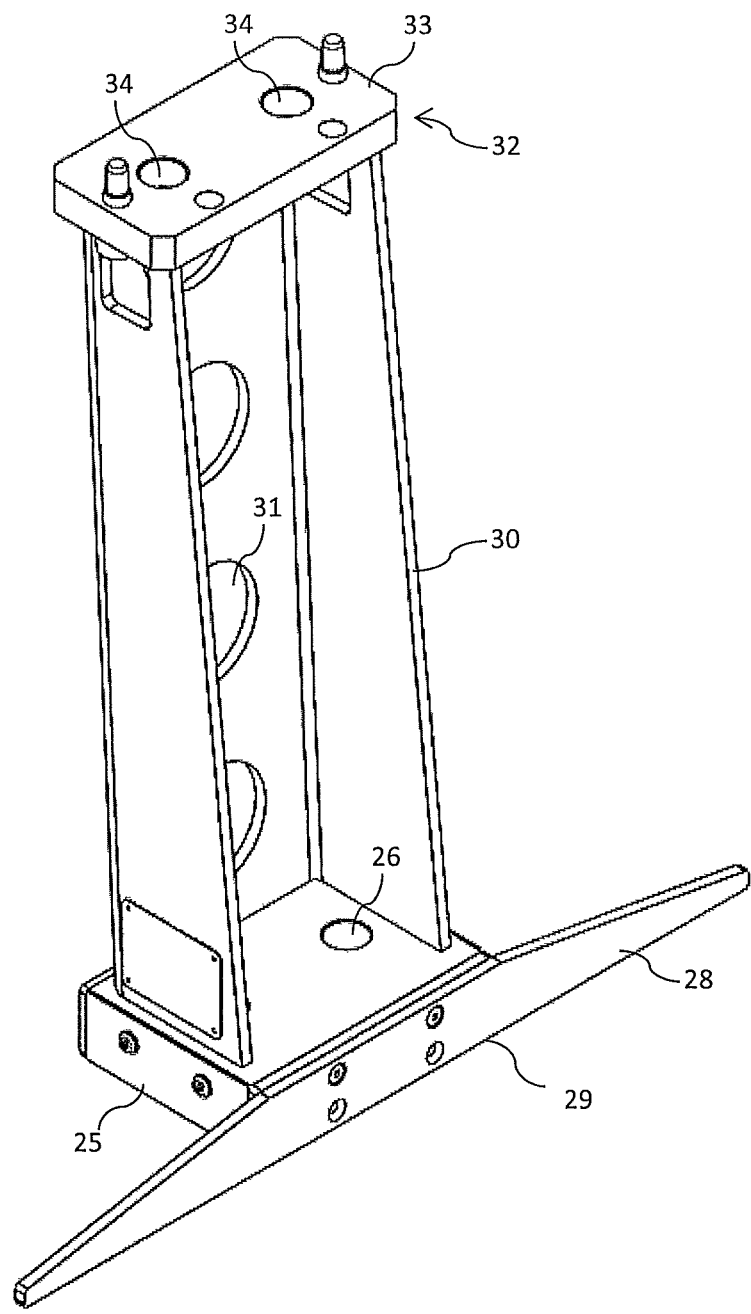
FIG. 3 shows a perspective view of the foot element of FIG. 2B.

The two exemplary embodiments of FIGS. 2A and 2B differ in that the foot element in FIG. 2B is provided with a support element (28). In order to secure the foot elements (20) against tilting or falling over, a support element can be arranged laterally with respect to the contact area (22) on the foot elements. FIG. 3 shows a perspective view of the foot element with support element (28) in a raised position. Such a support element is preferably arranged in such a way that a lower area of support (29) of the support element (28) has a small distance from a bottom surface, e.g. about 5 mm The support element is thus spaced from the bottom surface in such a way that a slight tilting of the foot element (20) which rests on the rail (10) already results in a placement of the support element (28) on the bottom surface so as to support the foot element (20). The support element can be made in the form of a sword or triangle, for example.

Figure 4:
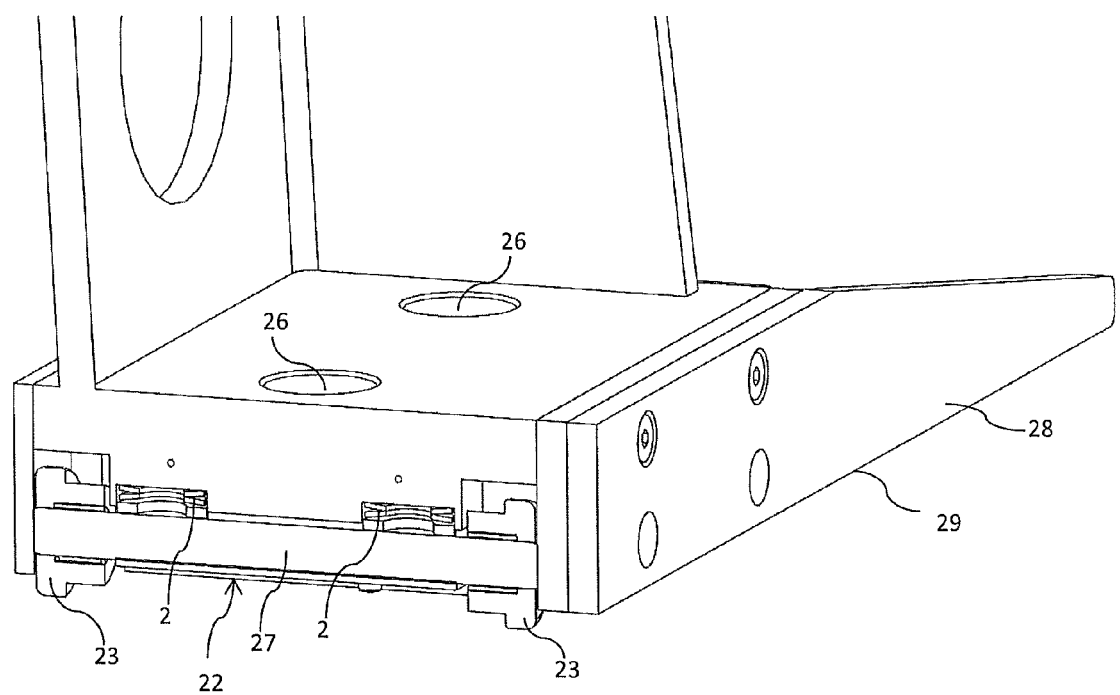
FIG. 4 shows a detailed sectional view of an exemplary embodiment of the foot element.

FIG. 4 shows a detailed sectional view of an exemplary embodiment of the foot element, said view illustrating the adjustment means made as a disk spring. In order to safely attach the foot element optionally to the guide rail or make it movable therealong in linear fashion, the foot element has a spring mechanism which is coupled to the rollers (23). In the exemplary embodiment as shown, two disk springs (2) are used for each wheel axis (27), said springs being arranged on the wheel axes (27) in such a way that they exert a force depending on the clamping state of the springs (2) on the bearing axis (27) of the rollers (23). For this purpose, the wheel axis (27) is held in vertically movable fashion in the traveling slide (25).

When the foot element (20) is not interlocked with the guide rail (10) by means of a bolt via the bore (26), the spring force of the disk springs (2) forces the wheel axis (27) downwards, and thus the rollers (23) protrude from the bottom side of the slide (25). In other words, the foot element (20) bounces up by the spring force, and therefore the foot element (20) no longer contacts the rail (10) on the planar contact area (22) but is only roller-mounted via the rollers (23). In this state, the foot element (10) is thus no longer in area contact with the rail (10) but only in line contact via the rollers (23).

In the state shown in FIG. 4 and comprising disk springs (2) in the biased state, the foot element (20) can be moved linearly by means of the rollers (23) along the guide rails (10). The disk springs (2) are never in a completely unbiased state due to the weight of the foot element and the table top.

Figure 5:
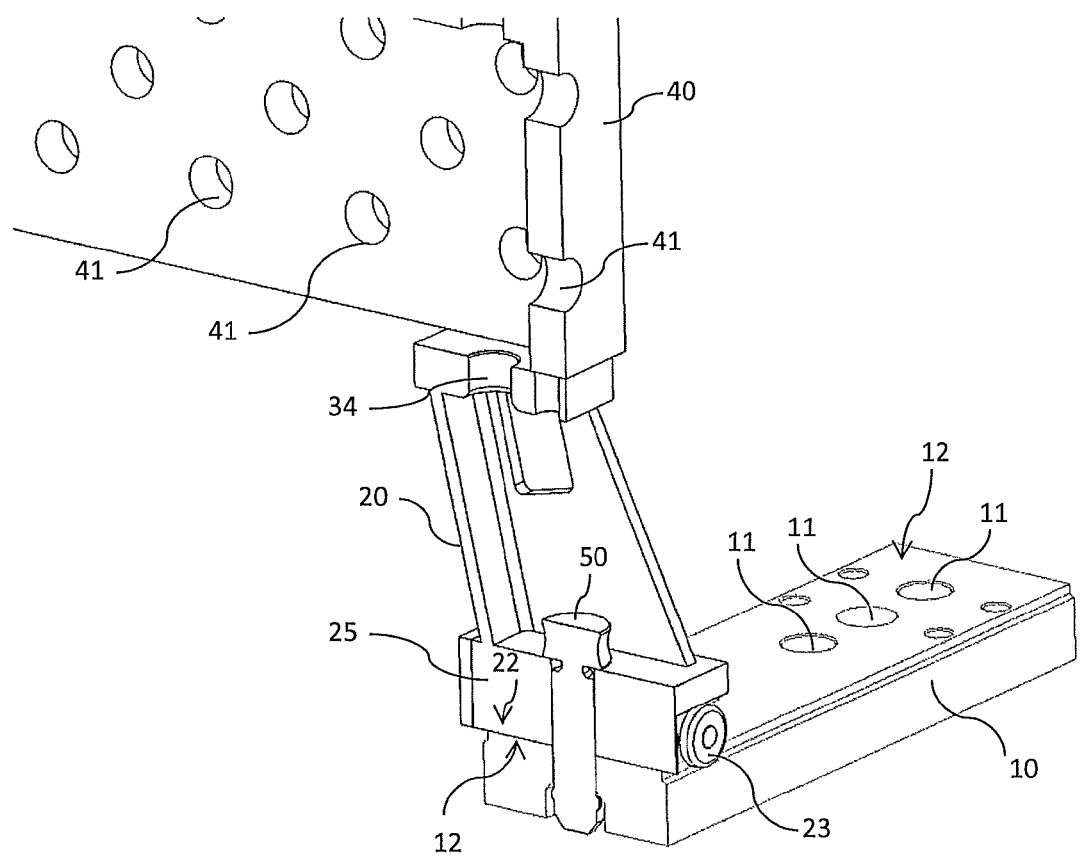
FIG. 5 shows a perspective sectional view of an exemplary embodiment of the moving system.
Figure 6A:
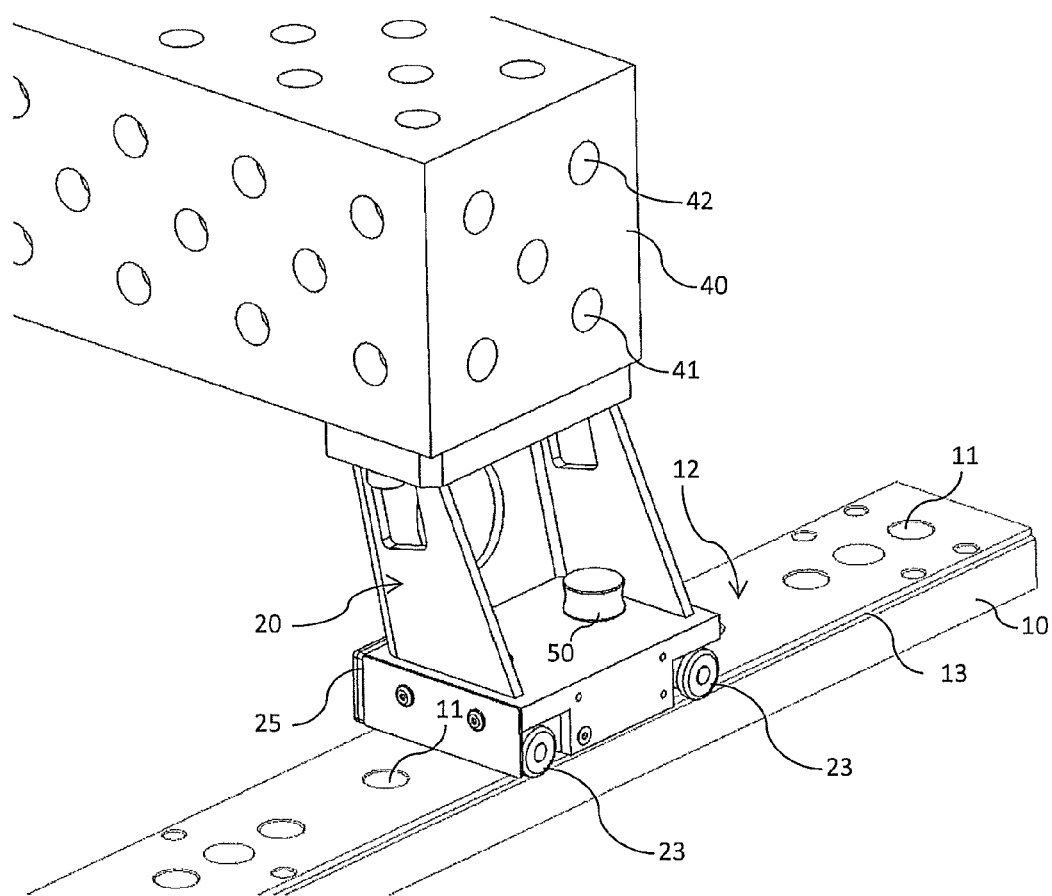
FIG. 6A and FIG. 6B show a perspective view and a sectional front view of the exemplary embodiment of the moving system according to the invention.
Figure 6B:
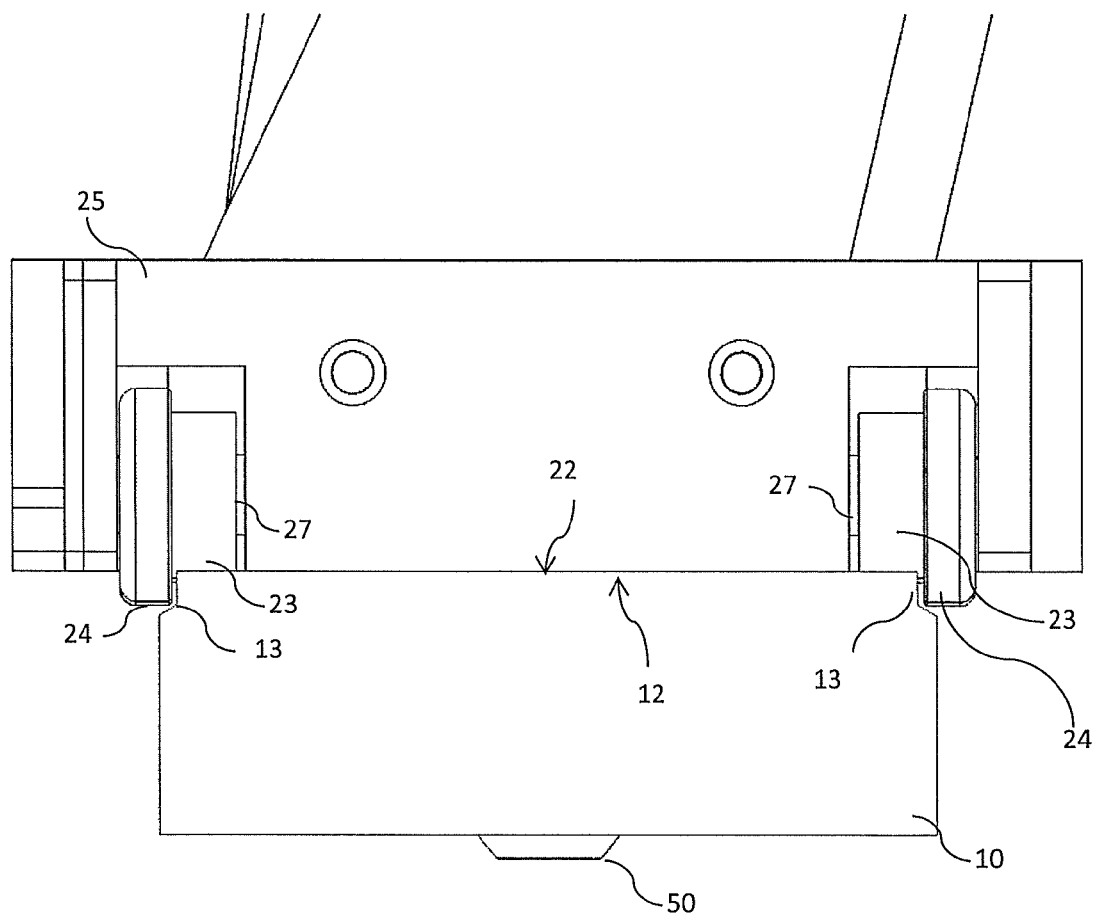

FIGS. 5, 6A and 6B show the moving system in a fixed state. Here, the foot element (20) is interlocked with the guide rail (10) via a clamping bolt (50). The disk springs (2) are further compressed by tightening the bolt and are further clamped on the basis of the biased state. As a result, the axis (27) and the rollers move somewhat up. In the clamped state by means of clamping bolts, the foot element (20) rests on the support surface (12) of the guide rail (10) via the contact area (22) and is in area contact therewith. In other words, the rollers are immersed into the traveling slide when the clamping force resulting from the bolt exceeds the bias force of the springs (2).

The sectional view of FIG. 6B shows that the guide rail (20) has a track recess (13) on which the roller (23) rests via its flange (24) and is guided therein.

Figure 7:
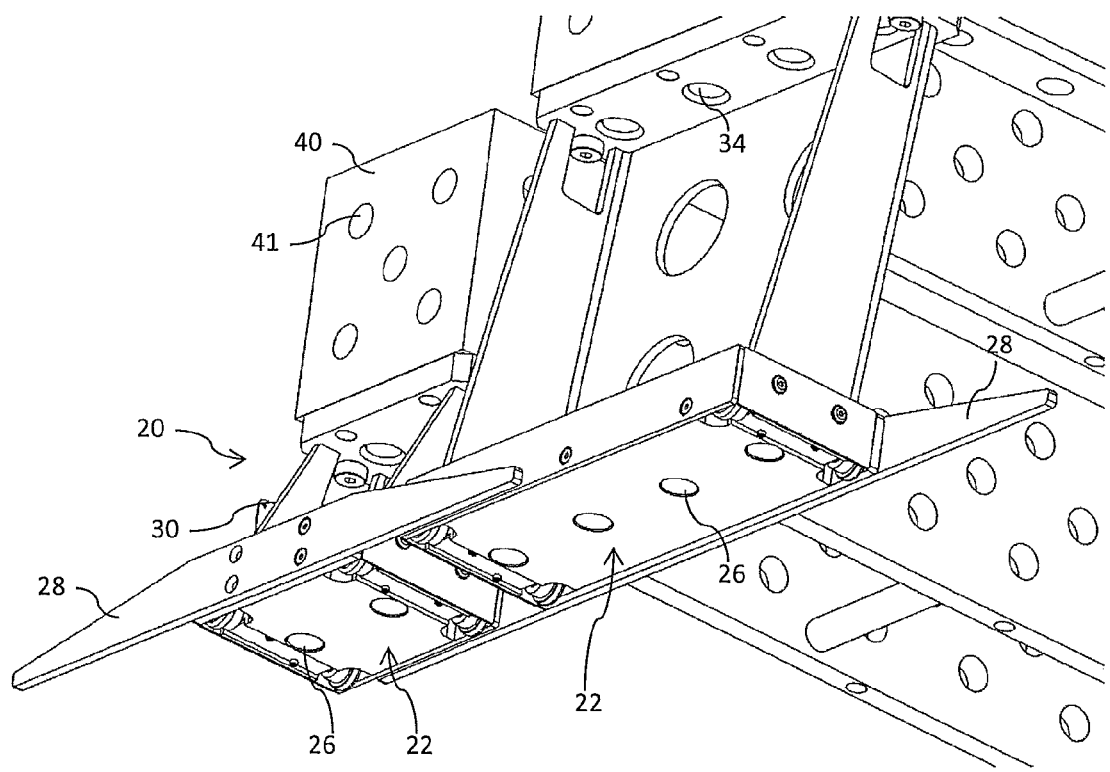
FIG. 7 shows a perspective bottom view without moving rail of an exemplary embodiment of the moving system.

FIG. 7 shows a perspective bottom view without a traversing rail (10) of two foot elements which are arranged one behind the other. The view of FIG. 7 illustrates how a staggered arrangement of the support elements (28) of two foot elements (20) arranged one behind the other serves for telescoping them in compact fashion. This advantageous arrangement is also evident in FIG. 1A.

Figure 8A:
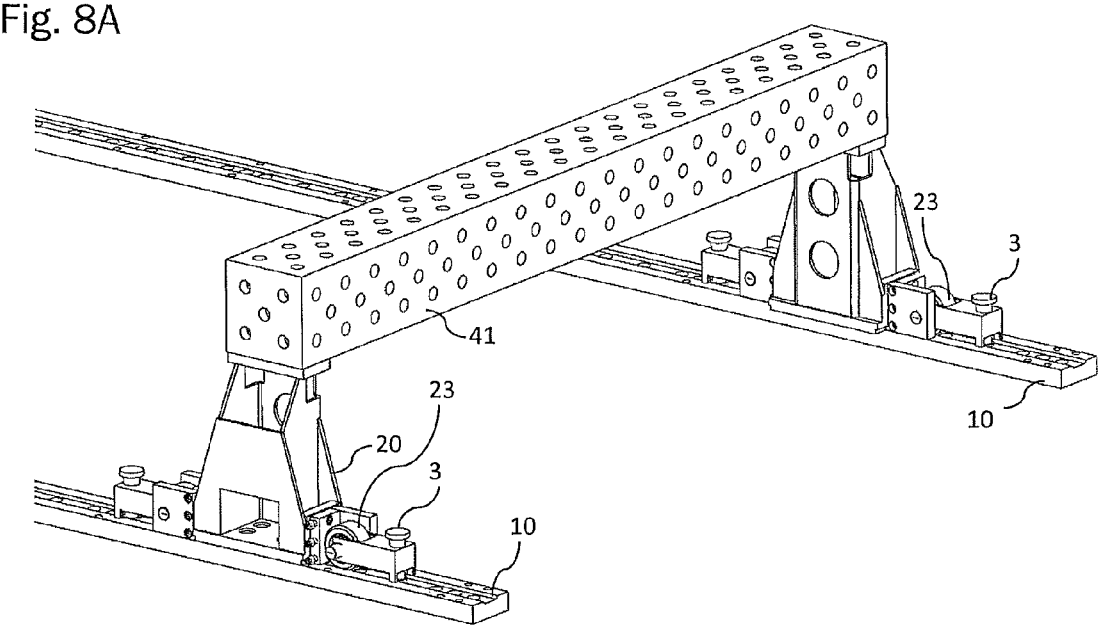
FIG. 8A and FIG. 8B show perspective views of another exemplary embodiment of the moving system according to the invention.
Figure 8B:
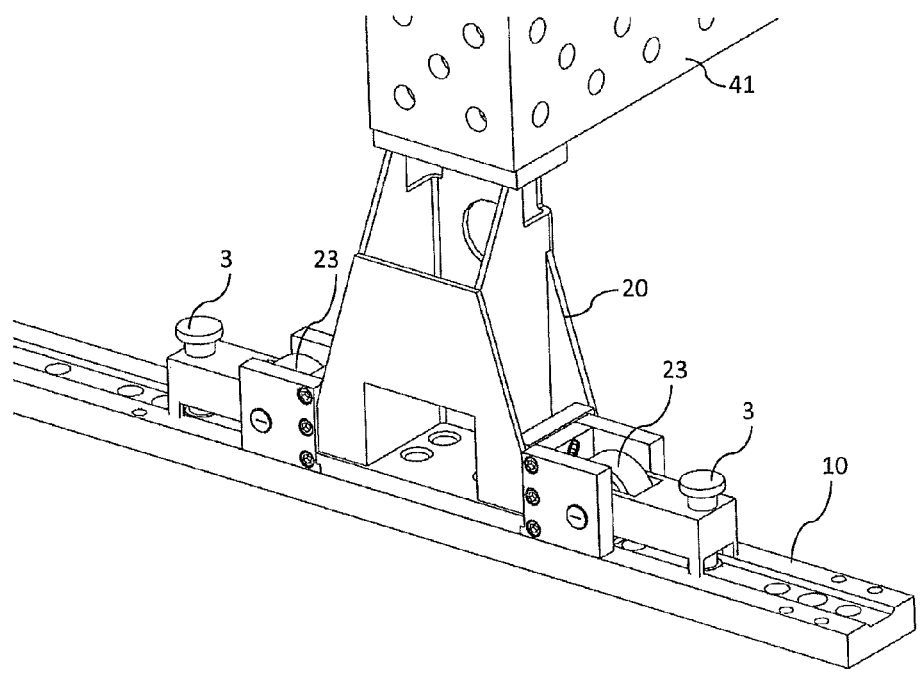
Figure 8C:
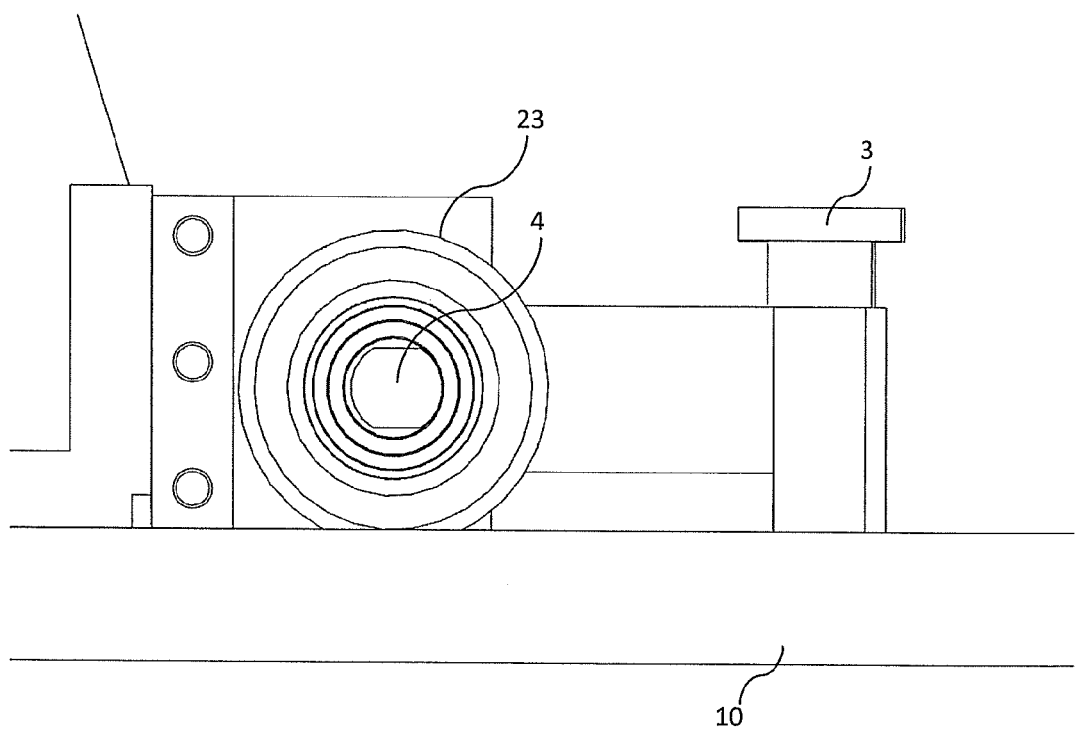
FIG. 8C shows a detailed view of the adjustment means according to an exemplary embodiment of the moving system according to the invention.

A further exemplary embodiment of the foot element is shown in FIGS. 8A, 8B and 8C. According to this exemplary embodiment, an extender (4) which is actuated via a handle (3) is used as an adjustment means. The extender (4), as shown in FIG. 8C, can be turned by pulling on the handle (3), e.g. by 90°. The extender is coupled to the fork of the bearing axis (not shown) in such a way that the bearing axis can be lifted or lowered by the rotary motion of the extender (4). Thus, a lifting movement is transmitted by the extender (4) onto the bearing axis and thus the rollers (23). For this purpose, a small lifting movement in the millimeter range is sufficient to move the rollers from the first position to the second position or from the second position to the first position.

Figure 9A:
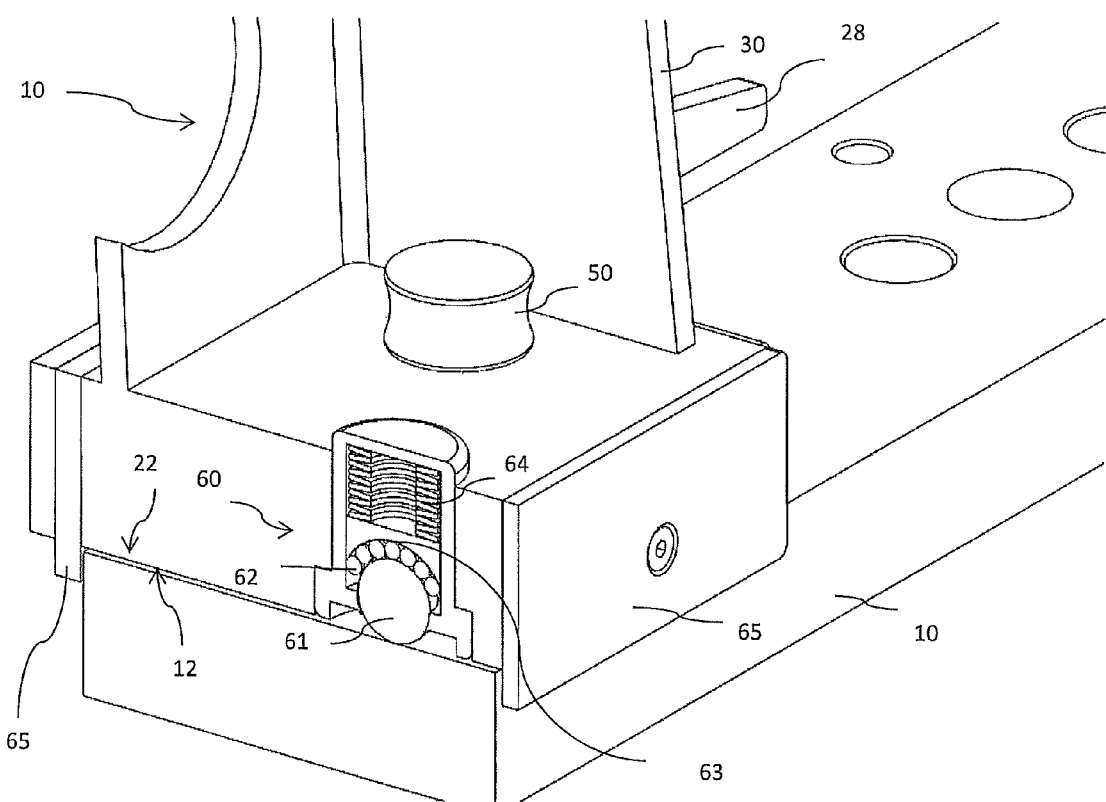
FIG. 9A and FIG. 9B show a perspective sectional view and a perspective bottom view of another exemplary embodiment of the moving system according to the invention.
Figure 9B:
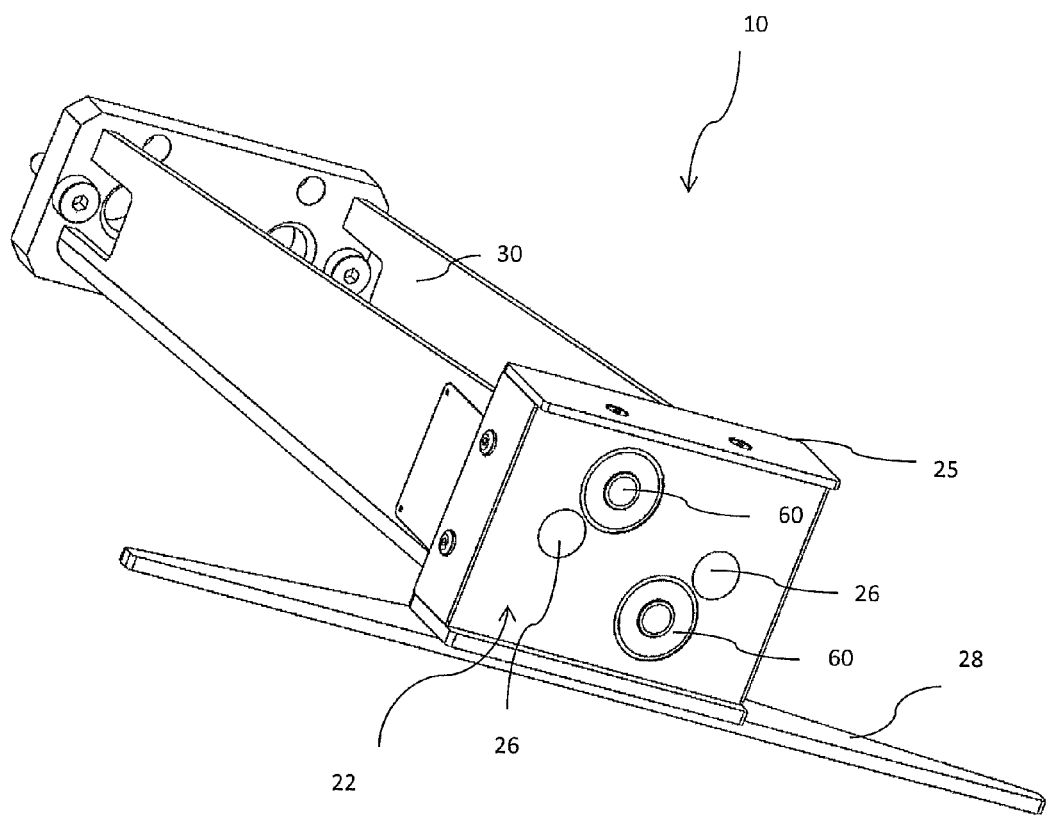

A further exemplary embodiment of a foot element is shown in FIGS. 9A and 9B where spring-suspended ball rollers (60) are used instead of the rollers (23) as rolling means. A ball roller (60) comprises a housing having a hardened ball socket (63) where many small support balls (62) roll which, in turn, carry a large running ball (61). A disk spring arrangement (64) is provided above the balls (62), (63) and exerts a spring force on the ball roller (60). Similar to the rollers (23), ball rollers (60) are held in vertically moveable fashion and coupled with the disk spring arrangement, and therefore they travel vertically into the traveling slide by interlocking the contact area (22) of the foot element (20) with the area of support (12) of the guide rails (10). If the bolt (50) is released, the disk spring arrangement (64) changes into the biased state where the ball rollers (60) bounce up the foot element (20), and therefore the contact area (22) of the foot element (20) is no longer in contact with the area of support (12) of the guide rail (10) but the foot element (20) is point-supported via the ball rollers (60). The point support would enable a movement in the X and Y directions. Therefore, guide plates (65) are provided which guarantee a linear movement of the ball rollers in the longitudinal direction of the guide rail (10) and thus a linear traveling movement of the foot element. As evident in FIG. 9A, the guide plates (65) are arranged for this purpose on the left-hand and right-hand sides of the guide rail (10) in such a way that they cover at least partly the lateral surfaces of the guide rail. In the biased state, the disk spring arrangement (64) serves as a protection mechanism, similar to the disk springs (2) of FIG. 4, to protect the rolling means against shocks, wear, etc. FIG. 9B shows a bottom view of FIG. 9A. In the exemplary embodiment, at least two ball rollers (60) are used which are arranged in a diagonally staggered fashion relative to the contact area (22) to guarantee a sufficient stability during the travel. However, it is also possible to use more than two ball rollers for each foot in the most widely differing arrangements. In order to prevent tilting of the foot (20), a support element (28) is again arranged laterally with respect to the contact area (22). Instead of the ball rollers (60), it is also possible to use spherical liners or rolling bearings.

The individual features of the invention are, of course, not limited to the described combinations of features on the basis of the presented exemplary embodiments and can be used depending on the predetermined device parameters in other combinations as well.

The invention claimed is:

1. A moving system for an assembly table or welding bench, comprising:
   a guide rail having grid holes;
   a foot element for an assembly table or welding bench, which can be contacted with the guide rail at a first end region, wherein a contact area and a rolling means are arranged at the first end region; and
   an adjustment means which is coupled to the rolling means,
      wherein the rolling means can be moved from a first position relative to the contact area to a second position relative to the contact area using the adjustment means, and
      wherein in the first position the contact area is in contact in a planar fashion with the guide rail, and in the second position the foot element on the guide rail is supported on the rolling means and can be moved linearly along the guide rail using the rolling means.

2. The moving system according to claim 1, wherein the adjustment means comprises a spring which is arranged in such a way that it exerts a force on the rolling means, said force depending on the tensioning state of the spring.

3. The moving system according to claim 2, wherein the spring is made as a disk spring.

4. The moving system according to claim 1, wherein the first end region comprises a bore or an elongated hole, which are arranged such that they can be superposed with a grid hole of the guide rail when the foot element is arranged in the first position on the guide rail.

5. The moving system according to claim 2, wherein the first end region comprises a bore or an elongated hole, which are arranged such that they can be superposed with a grid hole of the guide rail when the foot element is arranged in the first position on the guide rail.

6. The moving system according to claim 3, wherein the first end region comprises a bore or an elongated hole, which are arranged such that they can be superposed with a grid hole of the guide rail when the foot element is arranged in the first position on the guide rail.

7. The moving system according to claim 5, wherein the spring is arranged such that it is converted into a tensioned state by means of a clamping bolt which is guided into the superposed bores of the first end region and the guide rail so as to move the rolling means from the second position to the first position.

8. The moving system according to claim 6, wherein the spring is arranged such that it is converted into a tensioned state by means of a clamping bolt which is guided into the superposed bores of the first end region and the guide rail so as to move the rolling means from the second position to the first position.

9. The moving system according to claim 1, wherein the adjustment means comprises an extender which is coupled to the rolling means such that a movement of the extender effects swiveling-out of the rolling means from the first position to the second position or from the second position to the first position.

10. The moving system according to claim 4, wherein the adjustment means comprises an extender which is coupled to the rolling means such that a movement of the extender effects swiveling-out of the rolling means from the first position to the second position or from the second position to the first position.

11. The moving system according to claim 5, wherein the adjustment means comprises an extender which is coupled to the rolling means such that a movement of the extender effects swiveling-out of the rolling means from the first position to the second position or from the second position to the first position.

12. The moving system according to claim 6, wherein the adjustment means comprises an extender which is coupled to the rolling means such that a movement of the extender effects swiveling-out of the rolling means from the first position to the second position or from the second position to the first position.

13. The moving system according to claim 1, wherein the rolling means comprises rollers.

14. The moving system according to claim 13, wherein the rollers are made as flange rollers to guide the rollers linearly along the guide rail by means of a flange.

15. The moving system according to claim 1, wherein the rolling means comprises at least two ball rollers and guide means, wherein the guide means are arranged on the guide rail such that they guarantee on the guide rail a linear movement of the ball rollers which in the second position are in each case in point contact with the guide rail.

16. The moving system according to claim 4, wherein the rolling means comprises at least two ball rollers and guide means, wherein the guide means are arranged on the guide rail such that they guarantee on the guide rail a linear movement of the ball rollers which in the second position are in each case in point contact with the guide rail.

17. The moving system according to claim 5, wherein the rolling means comprises at least two ball rollers and guide means, wherein the guide means are arranged on the guide rail such that they guarantee on the guide rail a linear movement of the ball rollers which in the second position are in each case in point contact with the guide rail.

18. The moving system according to claim 6, wherein the rolling means comprises at least two ball rollers and guide means, wherein the guide means are arranged on the guide rail such that they guarantee on the guide rail a linear movement of the ball rollers which in the second position are in each case in point contact with the guide rail.

19. The moving system according to claim 1, wherein the foot element is provided with a support element laterally with respect to the contact area so as to prevent tilting of the foot element.

20. The moving system according to claim 1, comprising at least two foot elements arranged on the guide rail one behind the other, wherein each foot element is provided with a support element laterally with respect to the contact area so as to prevent tilting of the foot element, wherein the support elements of two foot elements disposed one behind the other are arranged on opposite sides of the guide rail.

\* \* \* \* \*